J. CARLSON.
CLOTH MILK STRAINER HOLDER.
APPLICATION FILED MAY 3, 1919.
1,335,656.
Patented Mar. 30, 1920.
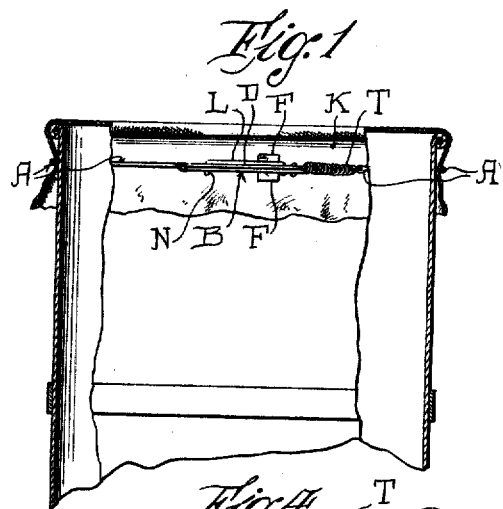
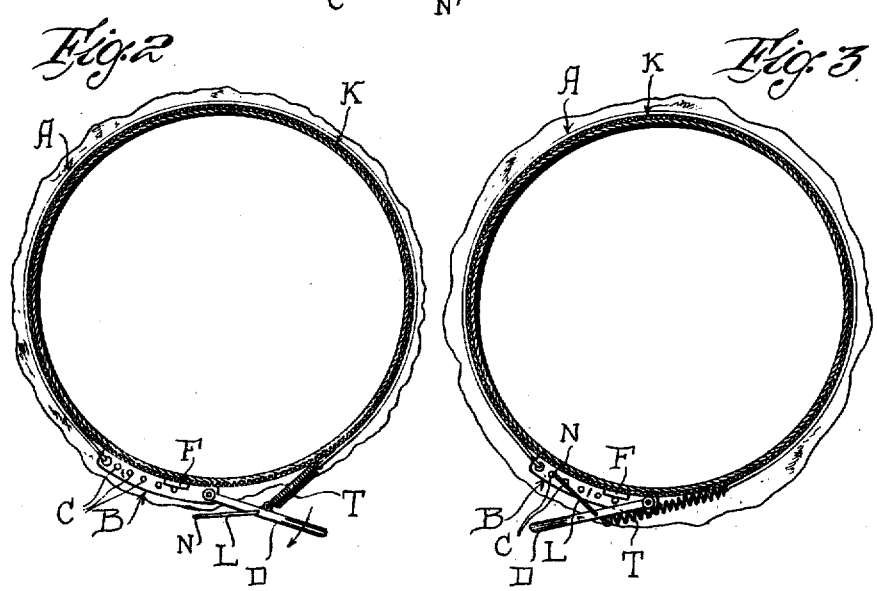
Inventor
J. Carlson
Attorney

UNITED STATES PATENT OFFICE.

JOSEPH CARLSON, OF ABBOTSFORD, WISCONSIN.

CLOTH-MILK-STRAINER HOLDER.

1,335,656.

Specification of Letters Patent.

Patented Mar. 30, 1920.

Application filed May 3, 1919. Serial No. 294,405.

*To all whom it may concern:*

Be it known that I, JOSEPH CARLSON, a citizen of the United States, residing at Abbotsford, in the county of Clark and State of Wisconsin, have invented certain new and useful Improvements in Cloth-Milk-Strainer Holders; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for holding a strainer over receptacles of various kinds, and consists of means for stretching a wire about the screen and holding the tension through a spring pressed lever device.

The invention comprises a simple and efficient device of this nature having various other details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which:

Figure 1 is a side elevation parts being shown in section, Fig. 2 is a horizontal sectional view, Fig. 3 is a similar view showing the device as having been tightened, and Fig. 4 is a perspective view of the device.

Reference now being had to the details of the drawings by letter:

A designates a wire attached to one end to a bar B which is provided with perforations C. A handle D is pivoted at one end of said bar and F designates plates secured to the bar opposite each other adapted to engage the circumference of the receptacle, over which a screen K is first placed. A rod L is pivotally connected to said handle and has a hooked end N adapted to engage one or another of the perforations in said bar. A coiled spring T is fastened at one end to the handle and its other end to one end of said wire.

In operation, the screen cloth is placed over the receptacle, the wire put over the cloth, after which, by swinging the lever, the wire may be drawn taut and the purchase held by the rod having angled ends which engages one or another of the perforations in said bar.

When it is desired to remove the device, it may be done by releasing the rod from the bar and permitting the wire to slack.

What I claim to be new is:

A clamping device for holding strainers upon milk bottles comprising a perforated plate having a longitudinally concaved edge adapted to conform to the convexed surface of the neck of a bottle, and to which one end of a wire is attached and designed to be passed about the neck of a bottle, said plate provided with oppositely disposed lugs, the outer faces of which are flush with the concaved edge of the plate, an apertured bar pivoted to said plate, a hook having pivotal connection with said bar and adapted to engage one or another of the apertures in said plate, and to which bar the other end of the wire for surrounding the bottle is adapted to have resilient connection.

In testimony whereof I hereunto affix my signature in presence of two witnesses.

JOSEPH CARLSON.

Witnesses:
G. M. QUIMETTE,
DORA LUNDAHL.